US010127819B1

(12) United States Patent
He et al.

(10) Patent No.: US 10,127,819 B1
(45) Date of Patent: Nov. 13, 2018

(54) INTELLIGENT ALARM SYSTEMS AND METHODS OF USING THE SAME

(71) Applicants: David Quan He, Johns Creek, GA (US); Chin Guan Kee, Perak (MY)

(72) Inventors: David Quan He, Johns Creek, GA (US); Chin Guan Kee, Perak (MY)

( * ) Notice: Subject to any disclaimer, the term of this patent is extended or adjusted under 35 U.S.C. 154(b) by 0 days.

(21) Appl. No.: 15/708,093

(22) Filed: Sep. 18, 2017

(51) Int. Cl.
*G08G 1/16* (2006.01)
*G08B 21/02* (2006.01)
*H04W 4/00* (2018.01)

(52) U.S. Cl.
CPC ............. *G08G 1/166* (2013.01); *G08B 21/02* (2013.01)

(58) Field of Classification Search
CPC ................................ G08G 1/166; G08B 21/02
USPC ..................................................... 340/539.11
See application file for complete search history.

(56) References Cited

U.S. PATENT DOCUMENTS

2003/0020623 A1* 1/2003 Cao ........................ G01C 21/20 340/686.6
2008/0109888 A1* 5/2008 Ullah ...................... G06F 21/10 726/7
2010/0295803 A1* 11/2010 Kim ...................... G06F 3/0488 345/173
2011/0238755 A1* 9/2011 Khan ...................... H04W 4/21 709/204
2012/0203620 A1* 8/2012 Dobyns .............. G06Q 30/0234 705/14.38
2012/0233557 A1* 9/2012 Wakhlu ................. G06F 3/0481 715/753
2015/0170498 A1* 6/2015 Beggs .................. B60Q 1/2673 340/686.6
2016/0373910 A1* 12/2016 Moss ...................... H04W 4/22
2017/0374511 A1* 12/2017 Buchmann ............. G06Q 50/28
2018/0000205 A1* 1/2018 Chinowsky ......... F21V 33/0008
2018/0027357 A1* 1/2018 Kwon ................... G06F 3/0488 709/229
2018/0101699 A1* 4/2018 Pollari ................... G06Q 30/02

* cited by examiner

*Primary Examiner* — Jack K Wang
(74) *Attorney, Agent, or Firm* — Ming Jiang; MM IP Services LLP

(57) ABSTRACT

The aspects of the present invention relate to intelligent alarm systems and methods of using the intelligent alarm systems. In certain embodiments, the intelligent alarm system includes: one or more personal alarm devices, one for each user, and an intelligent alarm controller. Personal alarm device includes a transceiver module and a personal alarm module. Intelligent alarm controller includes a proximity detection module, a transceiver module, and an alarm control module. When at least one user carrying personal alarm device approaches the intelligent alarm controller within a predetermined distance range, the intelligent alarm controller detects the user using ultra-wide band (UWB) radio frequency signals, turns on a controller alarm device using alarm control module, and instructs the personal alarm device in the predetermined distance range via the transceiver module of the personal alarm device to turn on one or more alarms on the personal alarm device using the personal alarm module.

20 Claims, 6 Drawing Sheets

1103

INTELLIGENT ALARM SYSTEMS AND METHODS OF USING THE SAME

FIELD

The present disclosure generally relates to safety, and more particularly to intelligent alarm systems and method using the intelligent alarm systems.

BACKGROUND

Forklifts, cranes and heavy trucks are very common in large manufacturing, construction, and transportation sites such as warehouses, ports and many other workplaces. Each year, there are thousands of accidents involving forklifts, cranes and heavy trucks because it is difficult for drivers of the forklifts, cranes and heavy trucks to maintain awareness of the surroundings. According to Occupational Safety and Health Administration (OSHA), the total number of injuries per year is roughly about 100,000 involving forklifts alone, accounting for more than 10% of work place death. Based on the estimated 900,000 forklifts in the United States, more than 1 in 10 forklifts are involved in an accident (assuming 1 accident per forklift) each year. It is desirable to have intelligent alarm systems to alert the drivers of the forklifts, and to have workers around the forklifts carry personal alarm devices such that these personal alarm devices can alert them when one or more forklifts are within a predetermined distance.

Therefore, a heretofore unaddressed need still exists in the art to address the aforementioned deficiencies and inadequacies.

SUMMARY

In one aspect, the present disclosure relates to an intelligent alarm system. In certain embodiments, the intelligent alarm system includes: one or more personal alarm devices, one for each of one or more users, and an intelligent alarm controller. Each of the personal alarm devices includes a transceiver module and a personal alarm module. The intelligent alarm controller includes a proximity detection module, a transceiver module, and an alarm control module. When at least one user carrying the personal alarm device approaches the intelligent alarm controller within a predetermined distance range, the intelligent alarm controller detects the presence of the user using the proximity detection module using an ultra-wide band (UWB) radio frequency signals, turns on a controller alarm device using the alarm control module, and instructs the personal alarm device in the predetermined distance range via the transceiver module of the personal alarm device to turn on one or more alarms on the personal alarm device using the personal alarm module.

In certain embodiments, the proximity detection module of the intelligent alarm controller includes a proximity detection range selector for selecting the predetermined distance range, and a proximity determination module for determining the distance between the intelligent alarm controller and the personal alarm device, and determining whether the personal alarm device is within the predetermined distance range.

In certain embodiments, the intelligent alarm controller further includes an in-range counter for counting the number of users within the predetermined distance range, and an in-range display for displaying the number of users within the predetermined distance range. When a user carrying a personal alarm device enters the predetermined distance range, the in-range counter increases by one, and when a user carrying a personal alarm device exits the predetermined distance range, the in-range counter decreases by one.

In certain embodiments, the alarm control module of the intelligent alarm controller turns on the controller alarm device when at least one user is within the predetermined distance range. The controller alarm device may include an audible alarm module, and a visual alarm module. The audible alarm module may include a siren device for providing a series of audible sound alarms, and a speaker device for providing voice alarms in one or more spoken languages. The visual alarm module may include a strobe light device for providing strobe light alarms, and a flash light device for providing flash light alarms.

In certain embodiments, each of the personal alarm devices includes the transceiver module for receiving the UWB radio frequency signals from the intelligent alarm controller, transmitting a response to the intelligent alarm controller such that the intelligent alarm controller determines the distance between the intelligent alarm controller and the personal alarm devices, and receiving alarm signals from the intelligent alarm controller to turn on one or more alarms on the personal alarm device using the personal alarm module.

In certain embodiments, the personal alarm module may include a vibration alarm device for providing vibration alarm to the user, an audible alarm device for providing audible alarms to the user, and a visual alarm device for providing visual alarms to the users. When at least one of the users is determined by the intelligent alarm controller to be within the predetermined distance range, one or more alarms on the personal alarm devices will be turned on by the personal alarm module. The audible alarm device may include a siren device for providing audible sound alarms, and a speaker device for providing voice alarms in one or more spoken languages. The visual alarm module may include a strobe light device for providing visible strobe light alarms, and a flash light device for providing visible flash light alarms.

In certain embodiments, each of the personal alarm devices includes a power module. The personal alarm device includes a power switch for turning on and off the personal alarm device, and a power source for providing electrical power to the personal alarm devices. The power source may be a battery or a rechargeable battery.

In another aspect, the present disclosure relates to an intelligent alarm system. In certain embodiments, the intelligent alarm system includes an intelligent alarm controller, and one or more personal alarm devices, one for each of one or more users. In certain embodiments, each of the personal alarm devices includes a transceiver module and a personal alarm module. The intelligent alarm controller includes a proximity detection module, a transceiver module, and an alarm control module. When at least one user carrying the personal alarm device departs the intelligent alarm controller and the distance between the personal alarm device and the intelligent alarm controller exceeds a predetermined distance range, the intelligent alarm controller detects the absence of the user using the proximity detection module using an ultra-wide band (UWB) radio frequency signals, turns on a controller alarm device using the alarm control module, and the personal alarm device turns on one or more alarms on the personal alarm device due to the absence of the communication to the intelligent alarm controller.

In certain embodiments, the proximity detection module of the intelligent alarm controller includes a proximity detection range selector for selecting the predetermined distance range, and a proximity determination module for determining the distance between the intelligent alarm controller and the personal alarm device, and whether the personal alarm device is within the predetermined distance range.

In certain embodiments, the intelligent alarm controller includes an in-range counter for counting the number of users within the predetermined distance range, and an in-range display for displaying the number of users within the predetermined distance range. When a user carrying the personal alarm device enters the predetermined distance range, the in-range counter increases by one. When a user carrying the personal alarm device exits the predetermined distance range, the in-range counter decreases by one.

In certain embodiments, the alarm control module of the intelligent alarm controller turns on the controller alarm device when at least one user exits the predetermined distance range. The controller alarm device includes an audible alarm module, and a visual alarm module. The audible alarm module of the controller alarm device may include a siren device for providing audible sound alarms, and a speaker device for providing voice alarms in one or more spoken languages. The visual alarm module of the controller alarm device may include a strobe light device for providing visible strobe light alarms, and a flash light device for providing visible flash light alarms.

In certain embodiments, each of the personal alarm devices includes the transceiver module for receiving the UWB radio frequency signals from the intelligent alarm controller, transmitting a response to the intelligent alarm controller such that the intelligent alarm controller determines the distance between the intelligent alarm controller and the personal alarm devices, and receiving alarm signals from the intelligent alarm controller to turn on one or more alarms on the personal alarm device using the personal alarm module.

In certain embodiments, the personal alarm module may include a vibration alarm device for providing vibration alarm to the user, an audible alarm device for providing audible alarms to the user, and a visual alarm device for providing visual alarms to the user. When at least one of the users within the predetermined distance range is determined by the intelligent alarm controller to be outside of the predetermined distance range, one or more alarms on the personal alarm devices will be turned on by the personal alarm module. The audible alarm device may include a siren device for providing audible sound alarms, and a speaker device for providing voice alarms in one or more spoken languages. The visual alarm module may include a strobe light device for providing visible strobe light alarms, and a flash light device for providing visible flash light alarms.

In certain embodiments, each of the personal alarm devices includes a power module. The personal alarm device includes a power switch for turning on and off the personal alarm device, and a power source for providing electrical power to the personal alarm devices. The power source may be a battery or a rechargeable battery.

In yet another aspect, the present disclosure relates to a method of using an intelligent alarm system. In certain embodiments, the method includes: turning on an intelligent alarm controller of the intelligent alarm system, and turning on and carrying, by each of one or more users, a personal alarm device. The intelligent alarm controller includes a proximity detection module, a transceiver module, and an alarm control module. Each of the personal alarm device includes a transceiver module, and a personal alarm module. The method also includes: adjusting, using a proximity detection range selector of the proximity detection module, a predetermined distance range; and detecting, by the proximity detection module, the presence of users each carrying the personal alarm device within the predetermined distance range using ultra-wide band (UWB) radio frequency signals.

In one embodiments, the method may include: when at least one user carrying the personal alarm device is determined by the proximity detection module to be within the predetermined distance ranger, the alarm control module of the intelligent alarm controller turns on a controller alarm device to generate audible and visible alarms of the intelligent alarm system, and the transceiver module of the intelligent alarm controller sends alarm signals to each of the personal alarm devices within the predetermined distance range to turn on the personal alarm module to generate audible and visible alarms of the personal alarm device.

In another embodiments, the method may include: when at least one user carrying the personal alarm device is determined by the proximity detection module to be outside of the predetermined distance ranger, the alarm control module of the intelligent alarm controller turns on the controller alarm device to generate audible and visible alarms of the intelligent alarm system, and the transceiver module of the intelligent alarm controller sends alarm signals to each of the personal alarm devices within the predetermined distance range to turn on the personal alarm module to generate audible and visible alarms of the personal alarm device.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
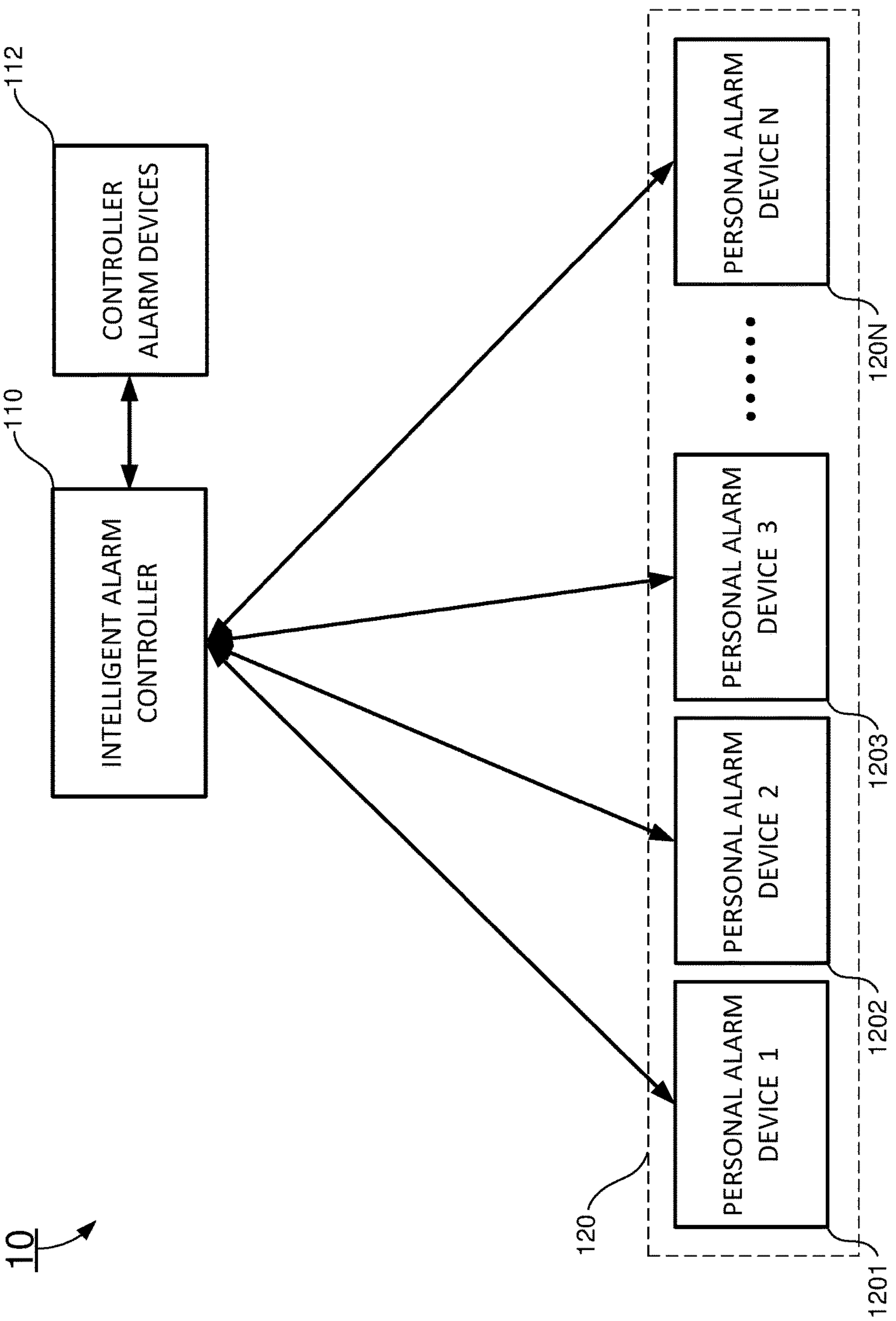
FIG. 1 illustrates an intelligent alarm system an intelligent alarm controller and one or more personal alarm devices according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of “a”, “an”, and “the” includes plural reference unless the context clearly dictates otherwise. Also, as used in the description herein and throughout the claims that follow, the meaning of “in” includes “in” and “on” unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, “around”, “about” or “approximately” shall generally mean within 20 percent, preferably within 10 percent, and more preferably within 5 percent of a given value or range. Numerical quantities given herein are approximate, meaning that the term “around”, “about” or “approximately” can be inferred if not expressly stated.

As used herein, “plurality” means two or more.

As used herein, the terms “comprising,” “including,” “carrying,” “having,” “containing,” “involving,” and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The description will be made as to the embodiments of the present disclosure in conjunction with the accompanying drawings FIGS. 1 through 6.

In workplaces, such as warehouse, ports, there may be many forklifts, cranes, and heavy trucks, and many workers who do not operating these forklifts, cranes and heavy trucks in the same environment. When these people are busy doing their jobs, they may not be aware the surroundings and accidents happen when these workers are not made aware of the forklifts, cranes, and heavy trucks nearby. The present disclosure presents a safety solution to such workplace to ensure the safety of everyone working in that environment.

Figure 2:
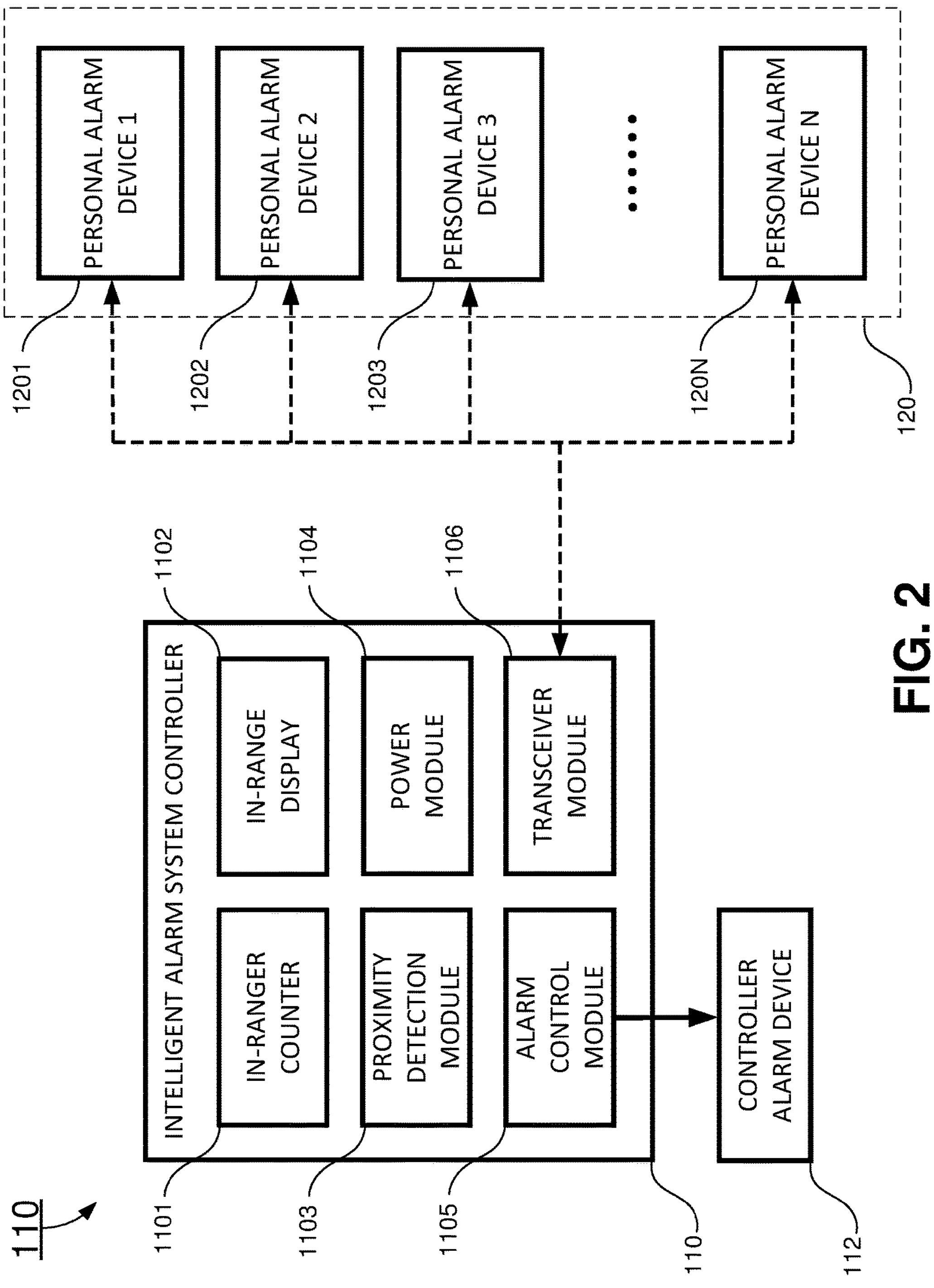
FIG. 2 shows an exemplary configuration of the intelligent alarm controller and its interactions with the personal alarm devices according to certain embodiments of the present disclosure.

In one aspect, as shown in FIGS. 1 and 2, the present disclosure relates to an intelligent alarm system 10. In certain embodiments, the intelligent alarm system 10 includes: an intelligent alarm controller 110, and N personal alarm devices 120: a first personal alarm device 1201, a second personal alarm device 1202, a third personal alarm device 1203, . . . , and an N-th personal alarm device 120N. In a workplace, each of the forklifts, cranes, and heavy trucks may be equipped with an intelligent alarm controller 110. For the safety of the workers in that environment, every user may be required to carry one personal alarm device 120 such that they may be alerted when one or more forklifts, cranes, and heavy trucks operating within a predetermined distance range. Each of the personal alarm devices 120 is communicating with the intelligent alarm controller 110 through ultra-wide band (UWB) radio frequency signals.

In certain embodiments, each of the personal alarm devices 120 includes a transceiver module 12002 and a personal alarm module 12004. The intelligent alarm controller 110 includes a proximity detection module 1103, a transceiver module 1106, and an alarm control module 1105. When at least one user carrying the personal alarm device 120 approaches a forklift, a crane, or a heavy truck equipped with the intelligent alarm controller 110 within a predetermined distance range, the intelligent alarm controller 110 detects the presence of the user using the proximity detection module 1103, turns on a controller alarm device 112 using the alarm control module 1105, and instructs the personal alarm device 120 in the predetermined distance range via the transceiver module 12002 of the personal alarm device 120 to turn on one or more alarms on the personal alarm device 120 using the personal alarm module 12004.

Referring now to FIG. 2, an exemplary configuration of the intelligent alarm controller 110 and its interactions with the personal alarm devices 120 are shown according to certain embodiments of the present disclosure. In an exemplary embodiment, the intelligent alarm controller 110 includes an in-range counter 1101, an in-range display 1102, a proximity detection module 1103, a power module 1104, an alarm control module 1105, and a transceiver module 1106.

Figure 3:
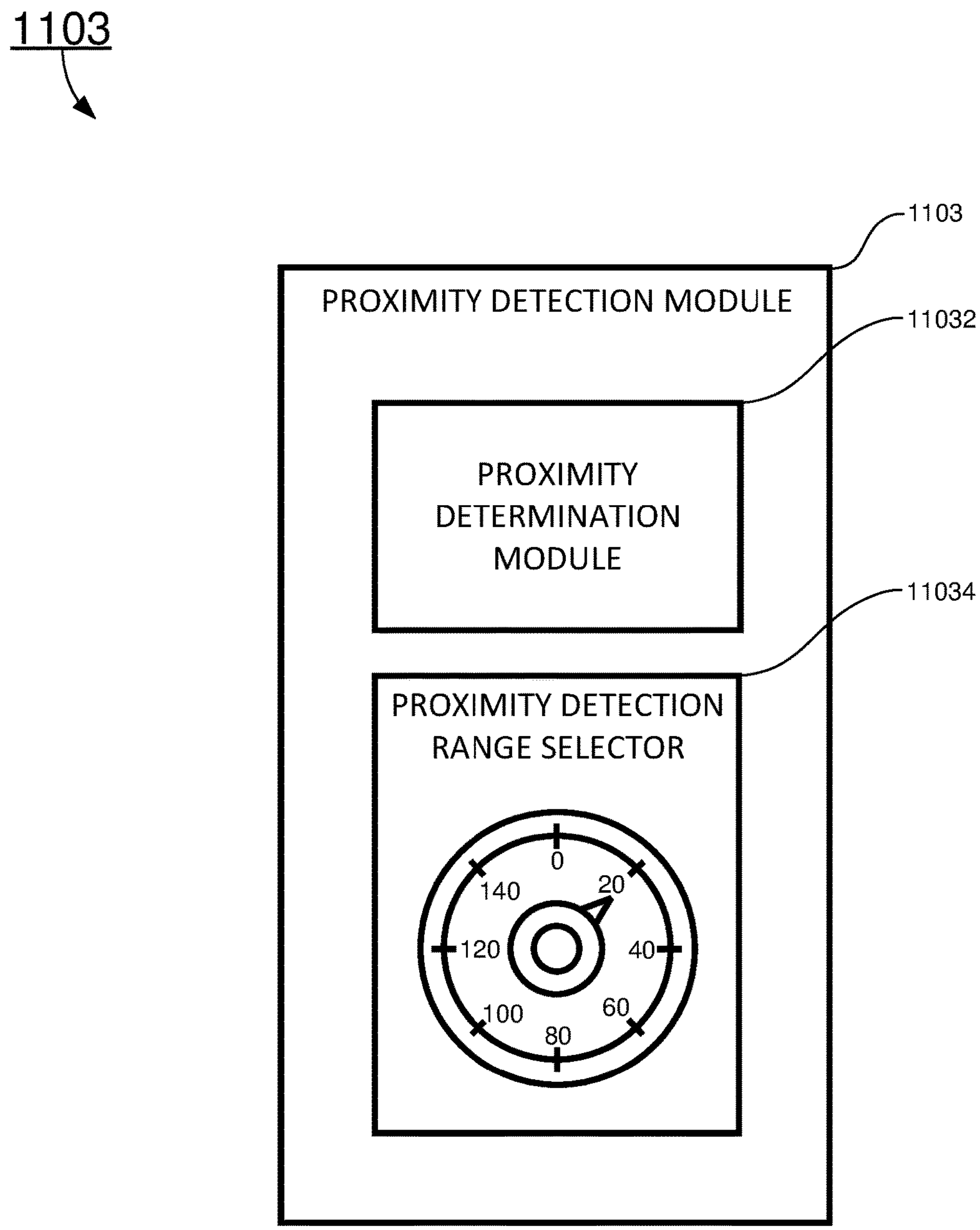
FIG. 3 illustrates an exemplary proximity detection module of the intelligent alarm controller according to one embodiment of the present disclosure.
Figure 4:
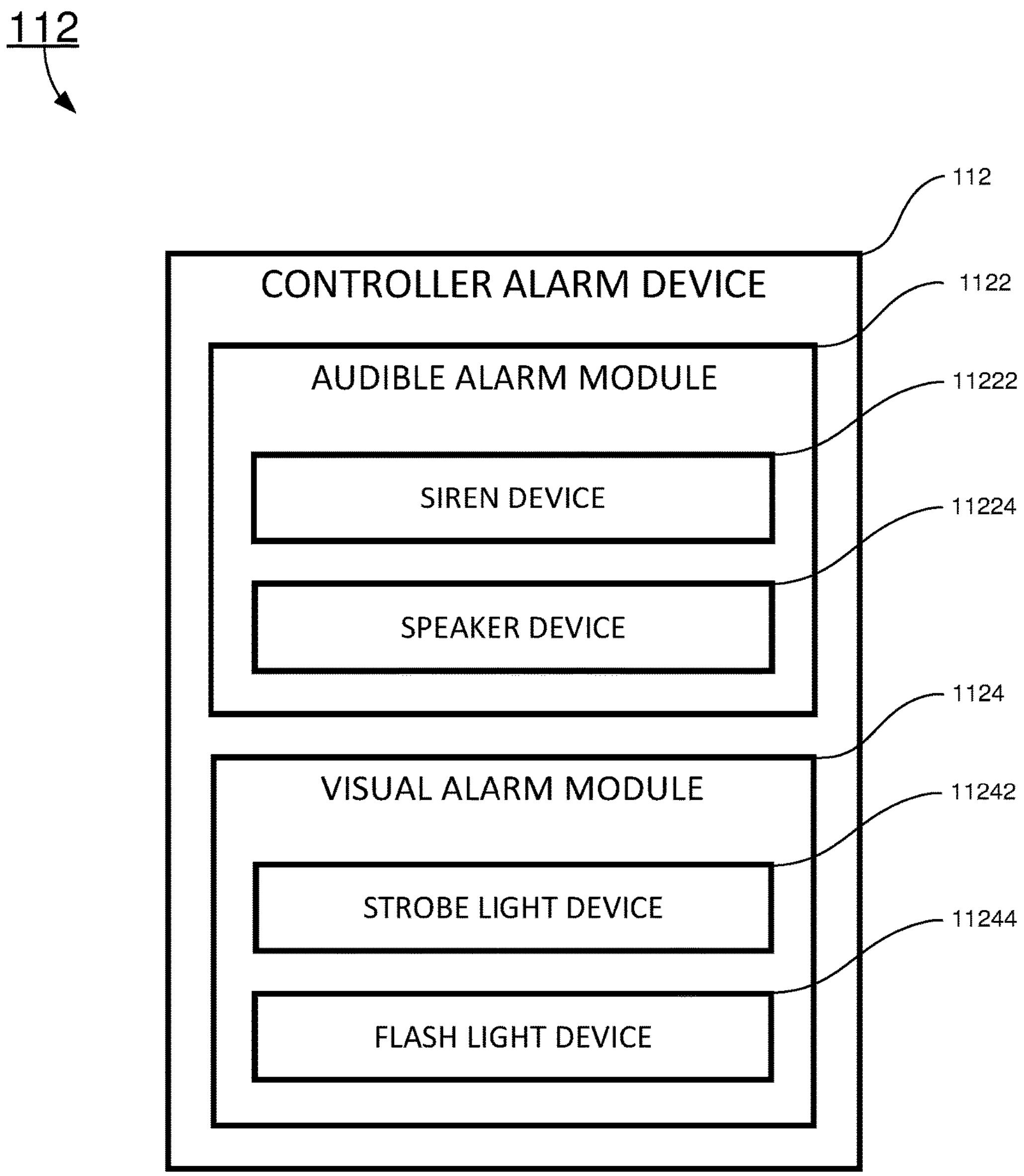
FIG. 4 illustrates an exemplary controller alarm device of the intelligent alarm system according to certain embodiments of the present disclosure.

In certain embodiments, as shown in FIG. 3, the proximity detection module 1103 of the intelligent alarm controller 110 includes a proximity detection range selector 11034 and a proximity determination module 11032. An operator of the forklift, crane or heavy truck may select a predetermined distance range using a dial on the proximity detection range selector 11034. In the exemplary embodiment shown in FIG. 3, the predetermined distance range may be selected between 0 and 140 feet. Other distance may be built depending on the application of the intelligent alarm system 10. Once the intelligent alarm controller 110 is turned on, the proximity determination module 11032 transmits ultra-wide band (UWB) radio frequency signals in its surrounding area through the transceiver module 1106.

In certain embodiments, when no personal alarm device 120 is within the predetermined distance range, the proximity determination module 11032 detects nothing. When at least one user carrying an operating personal alarm device 120 approaches the intelligent alarm controller 110 within the predetermined distance range, the personal alarm device 120 receives the UWB radio frequency signals and transmits a response to the transceiver module 1106 of the intelligent alarm controller 110, the transceiver module 1106 of the intelligent alarm controller 110 receives the response from the personal alarm device 120 to determine the distance between the intelligent alarm controller 110 and the personal alarm device 120 using the proximity determination module 11032. When the distance between the intelligent alarm controller 110 and the personal alarm device 120 is within the predetermined distance range, the alarm control module 1105 of the intelligent alarm controller 110 turns on the controller alarm device 112 to generate alerts of the intelligent alarm controller 110.

In certain embodiments, the controller alarm device 112 may include an audible alarm module 1122, and a visual alarm module 1124. The audible alarm module 1122 may include a siren device 11222 for providing a series of audible sound alarms, and a speaker device 11224 for providing voice alarms in one or more spoken languages. The visual alarm module 1124 may include a strobe light device 11242 and a flash light device 11244. The strobe light device 11242 may provide visible strobe light alarms. The flash light device 11244 may provide visible flash light alarms.

In certain embodiments, the power module 1104 provides electric power to the intelligent alarm controller 110. In certain embodiments, the power module 1104 receives electric power from the forklift, the crane, or the heavy truck where the intelligent alarm controller 110 is installed. In one embodiment, the power module 1104 have a power converter to convert 110V alternate current (AC) to a desired direct current (DC) voltage for the intelligent alarm controller 110. In another embodiment, the power module 1104 have a power converter to convert 12V AC, commonly available in forklifts, or heavy trucks, to a desired DC voltage for the intelligent alarm controller 110. In yet another embodiment, the power module 1104 includes a battery or rechargeable battery such that the intelligent alarm controller 110 may be operated in an environment where 110V AC and 12V DC are not available.

In certain embodiments, the in-range counter 1101 of the intelligent alarm controller 110 may be used to count the number of users within the predetermined distance range. When a user carrying a personal alarm device 120 enters the predetermined distance range, the in-range counter increases by one, and when a user carrying a personal alarm device 120 exits the predetermined distance range, the in-range counter decreases by one. The number of users within the predetermined distance range counted by the in-range counter 1101 may be displayed on the in-range display 1102. In this way, the operator of the forklift, the crane and the heavy truck can look at the in-range display 1102 so that he/she is made aware the number of users carrying the personal alarm devices 120 in the predetermined distance range. The operator's awareness of his/her surroundings is increased and safety measures are enhanced.

Figure 5:
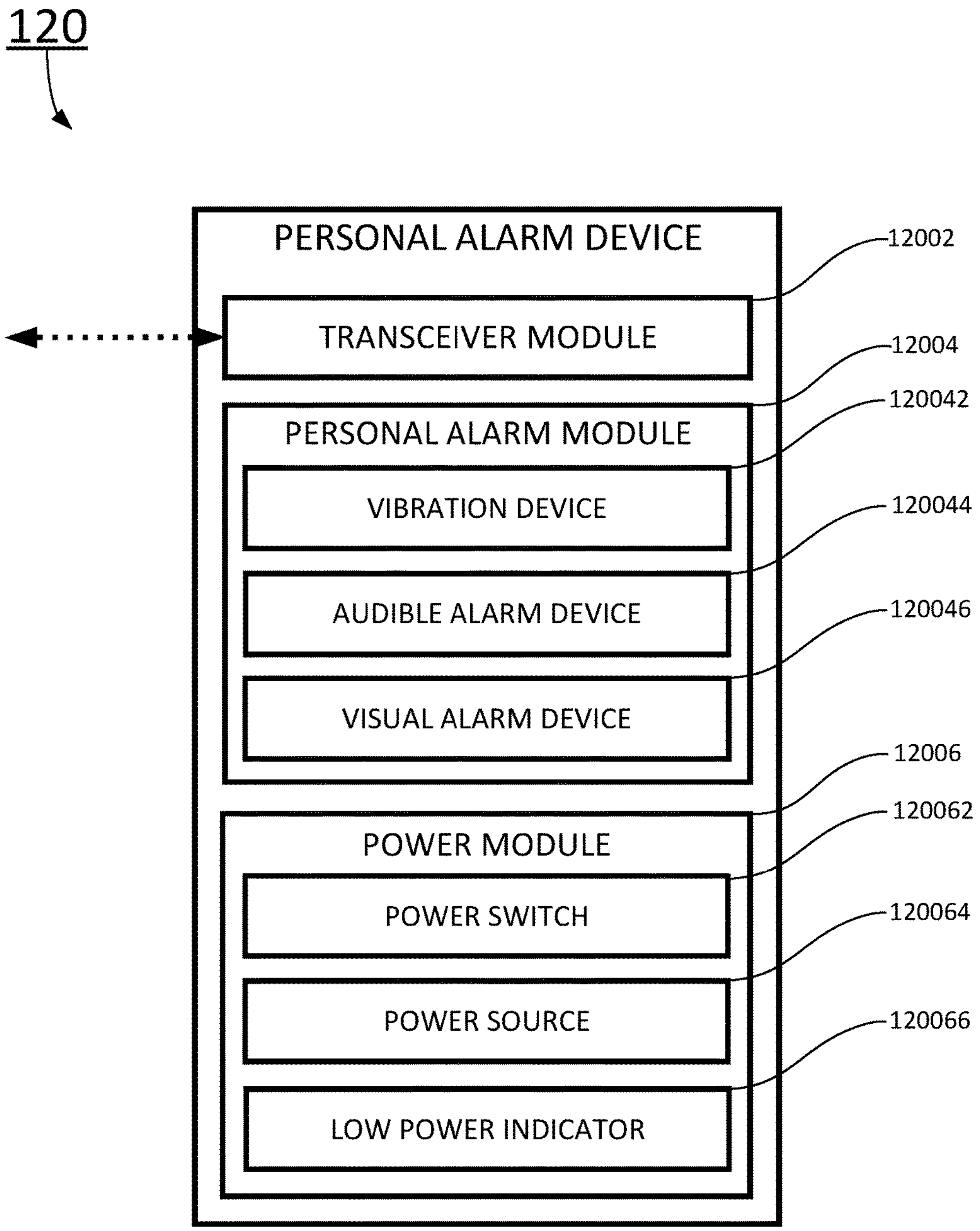
FIG. 5 illustrates an exemplary personal alarm device of the intelligent alarm system according to certain embodiments of the present disclosure and FIG. 6 is a flowchart of the method of using the intelligent alarm systems according to one embodiment of the present disclosure.

In certain embodiments, as shown in FIG. 5, each of the personal alarm devices 120 includes the transceiver module 12002 and the personal alarm module 12004. The transceiver module 12002 receives the UWB radio frequency signals from the intelligent alarm controller 110, transmits a response to the intelligent alarm controller 110 such that the intelligent alarm controller 110 determines the distance between the intelligent alarm controller 110 and the personal alarm devices 120, and receives alarm signals from the intelligent alarm controller 110 to turn on one or more alarms on the personal alarm device 120 using the personal alarm module 12004.

In certain embodiments, the personal alarm module 12004 may include a vibration alarm device 120042 for providing vibration alarm to the user, an audible alarm device 120044 for providing audible alarms to the user, and a visual alarm device 120046 for providing visual alarms to the users. When at least one of the users is determined by the intelligent alarm controller 110 to be within the predetermined distance range, one or more alarms on the personal alarm devices 120 will be turned on by the personal alarm module 12004. The audible alarm device 120044 may include a siren device for providing audible sound alarms, and a speaker device for providing voice alarms in one or more spoken languages. The visual alarm module 12046 may include a strobe light device for providing visible strobe light alarms, and a flash light device for providing visible flash light alarms.

In certain embodiments, each of the personal alarm devices 120 includes a power module 12006. The personal alarm device 120 includes a power switch 120062 for turning on and off the personal alarm device 120, and a power source 120064 for providing electrical power to the personal alarm devices 120. The power source 120064 may be a battery or a rechargeable battery. In certain embodiments, the personal alarm device 120 may include a low power indicator 120066. In one embodiment, the low power indicator 120066 is a colored light emitting diode (LED). When the low power indicator 120066 is illuminated or flashing, the low power indicator 120066 indicates the battery is low and should be replaced soon to ensure the proper operation of the personal alarm device 120. In another embodiment, when the low power indicator 120066 is illuminated or flashing, the low power indicator 120066 indicates the rechargeable battery is low and should be recharged soon to ensure the proper operation of the personal alarm device 120.

In certain kindergarten or daycare centers, there may exist another safety issue. One caregiver or teacher may be responsible for a group of children in the facility. Sometimes, children may wonder off their playroom or class room without the caregiver or teachers notice. Children may be abducted if someone without legal authority or permission of custodian takes the child without permission from the caregiver or teachers. According to a report by the Office of Juvenile Justice and Delinquency Prevention, Office of Justice Program, U.S. Department of Justice in 2005, Caretaker missing children is estimated between 1,131,100 to 1,500,100, or 18.8 per 1000 U.S. Child Population. The present disclosure presents a solution to this problem.

Referring now to FIGS. 1 and 2, in another aspect, the present disclosure relates to an intelligent alarm system 10 that monitors children in a restricted area. In certain embodiments, the intelligent alarm system 10 includes: an intelligent alarm controller 110, and N personal alarm devices 120: a first personal alarm device 1201, a second personal alarm device 1202, a third personal alarm device 1203, . . . , and an N-th personal alarm device 120N. In a childcare setting, each of the restricted areas such as classroom, playroom, or playground may be equipped with an intelligent alarm controller 110. In one embodiment, the intelligent alarm controller 110 may be placed near the center of the restricted area. In another embodiment, the caregiver or teacher may carry the intelligent alarm controller 110. For the safety of the children in that environment, every child may be required to carry one personal alarm device 120 such that their caregivers or teachers and the children carrying the personal alarm devices 120 may be alerted when one or more children depart from the restricted area defined by a predetermined distance range. Each of the personal alarm devices 120 is communicating with the intelligent alarm controller 110 through ultra-wide band (UWB) radio frequency signals.

In certain embodiments, each of the personal alarm devices 120 includes a transceiver module 12002 and a personal alarm module 12004. The intelligent alarm controller 110 includes a proximity detection module 1103, a transceiver module 1106, and an alarm control module 1105. When at least one child carrying the personal alarm device 120 departs the restricted area defined by the predetermined distance range, the intelligent alarm controller 110 is programmed to detect the absence of the child using the proximity detection module 1103, turn on a controller alarm device 112 using the alarm control module 1105, and instruct the personal alarm device 120 via the transceiver module 12002 of the personal alarm device 120 to turn on one or more alarms on the personal alarm device 120 using the personal alarm module 12004.

Referring now to FIG. 2, an exemplary configuration of the intelligent alarm controller 110 and its interactions with the personal alarm devices 120 are shown according to certain embodiments of the present disclosure. In an exemplary embodiment, the intelligent alarm controller 110 includes an in-range counter 1101, an in-range display 1102, a proximity detection module 1103, a power module 1104, an alarm control module 1105, and a transceiver module 1106.

In certain embodiments, as shown in FIG. 3, the proximity detection module 1103 of the intelligent alarm controller 110 includes a proximity detection range selector 11034 and a proximity determination module 11032. A caregiver, a teacher or an administrator may select the predetermined distance range using a dial on the proximity detection range selector 11034. In the exemplary embodiment shown in FIG. 3, the predetermined distance range may be selected between 0 and 140 feet. Other distance may be built depending on the application of the intelligent alarm system 10. Once the intelligent alarm controller 110 is turned on, the proximity determination module 11032 transmits ultra-wide band (UWB) radio frequency signals in its surrounding area through the transceiver module 1106.

In certain embodiments, when at least one child carrying an operating personal alarm device 120 departs the restricted area, the personal alarm device 120 receives the UWB radio frequency signals and transmits a response to the transceiver module 1106 of the intelligent alarm controller 110. The transceiver module 1106 of the intelligent alarm controller 110 receives the response from the personal alarm device 120 to determine the distance between the intelligent alarm controller 110 and the personal alarm device 120 using the proximity determination module 11032. When the distance between the intelligent alarm controller 110 and the personal alarm device 120 is beyond the predetermined distance range, the alarm control module 1105 of the intelligent alarm controller 110 turns on the controller alarm device 112 to generate alerts of the intelligent alarm controller 110.

In certain embodiments, the controller alarm device 112 may include an audible alarm module 1122, and a visual alarm module 1124. The audible alarm module 1122 may include a siren device 11222 for providing a series of audible sound alarms, and a speaker device 11224 for providing voice alarms in one or more spoken languages. The visual alarm module 1124 may include a strobe light device 11242 and a flash light device 11244. The strobe light device 11242 may provide visible strobe light alarms. The flash light device 11244 may provide visible flash light alarms.

In certain embodiments, the power module 1104 provides electric power to the intelligent alarm controller 110. In certain embodiments, the power module 1104 receives electric power from the restricted area where the intelligent alarm controller 110 is installed. In one embodiment, the power module 1104 have a power converter to convert 110V alternate current (AC) to a desired direct current (DC) voltage for the intelligent alarm controller 110. In another embodiment, the power module 1104 includes a battery or rechargeable battery for a portable intelligent alarm controller 110 such that the intelligent alarm controller 110 may be operated in an environment where 110V AC or other DC power sources are not available.

In certain embodiments, the in-range counter 1101 of the intelligent alarm controller 110 may be used to count the number of children within the restricted area defined by the predetermined distance range. When a child carrying a personal alarm device 120 enters the restricted area, the in-range counter increases by one, and when a child carrying a personal alarm device 120 exits the restricted area, the in-range counter decreases by one. The number of children within the predetermined distance range counted by the in-range counter 1101 may be displayed on the in-range display 1102. In this way, the caregiver or the teacher can look at the in-range display 1102 so that he/she is made aware the number of children carrying the personal alarm devices 120 in the restricted area, and take immediate actions if the number does not match the number of children signed in. The caregiver's or the teacher's awareness of his/her surroundings is increased and safety measures are enhanced.

In certain embodiments, as shown in FIG. 5, each of the personal alarm devices 120 includes the transceiver module 12002 and the personal alarm module 12004. The transceiver module 12002 receives the UWB radio frequency signals from the intelligent alarm controller 110, transmits a response to the intelligent alarm controller 110 such that the intelligent alarm controller 110 determines the distance between the intelligent alarm controller 110 and the personal alarm devices 120, and receives alarm signals from the intelligent alarm controller 110 to turn on one or more alarms on the personal alarm device 120 using the personal alarm module 12004.

In certain embodiments, the personal alarm module 12004 may include a vibration alarm device 120042 for providing vibration alarm to the child, an audible alarm device 120044 for providing audible alarms to the child, and a visual alarm device 120046 for providing visual alarms to the child. When at least one of the children is determined by the intelligent alarm controller 110 to be outside of the restricted area, one or more alarms on the personal alarm devices 120 will be turned on by the personal alarm module 12004. The audible alarm device 120044 may include a siren device for providing audible sound alarms, and a speaker device for providing voice alarms in one or more spoken languages. The visual alarm module 12046 may include a strobe light device for providing visible strobe light alarms, and a flash light device for providing visible flash light alarms.

In certain embodiments, each of the personal alarm devices 120 includes a power module 12006. The personal alarm device 120 includes a power switch 120062 for turning on and off the personal alarm device 120, and a power source 120064 for providing electrical power to the personal alarm devices 120. The power source 120064 may be a battery or a rechargeable battery. In certain embodiments, the personal alarm device 120 may include a low power indicator 120066. In one embodiment, the low power indicator 120066 is a colored light emitting diode (LED). When the low power indicator 120066 is illuminated or flashing, the low power indicator 120066 indicates the battery is low and should be replaced soon to ensure the proper operation of the personal alarm device 120. In another embodiment, when the low power indicator 120066 is illuminated or flashing, the low power indicator 120066 indicates the rechargeable battery is low and should be recharged soon to ensure the proper operation of the personal alarm device 120.

Figure 6:
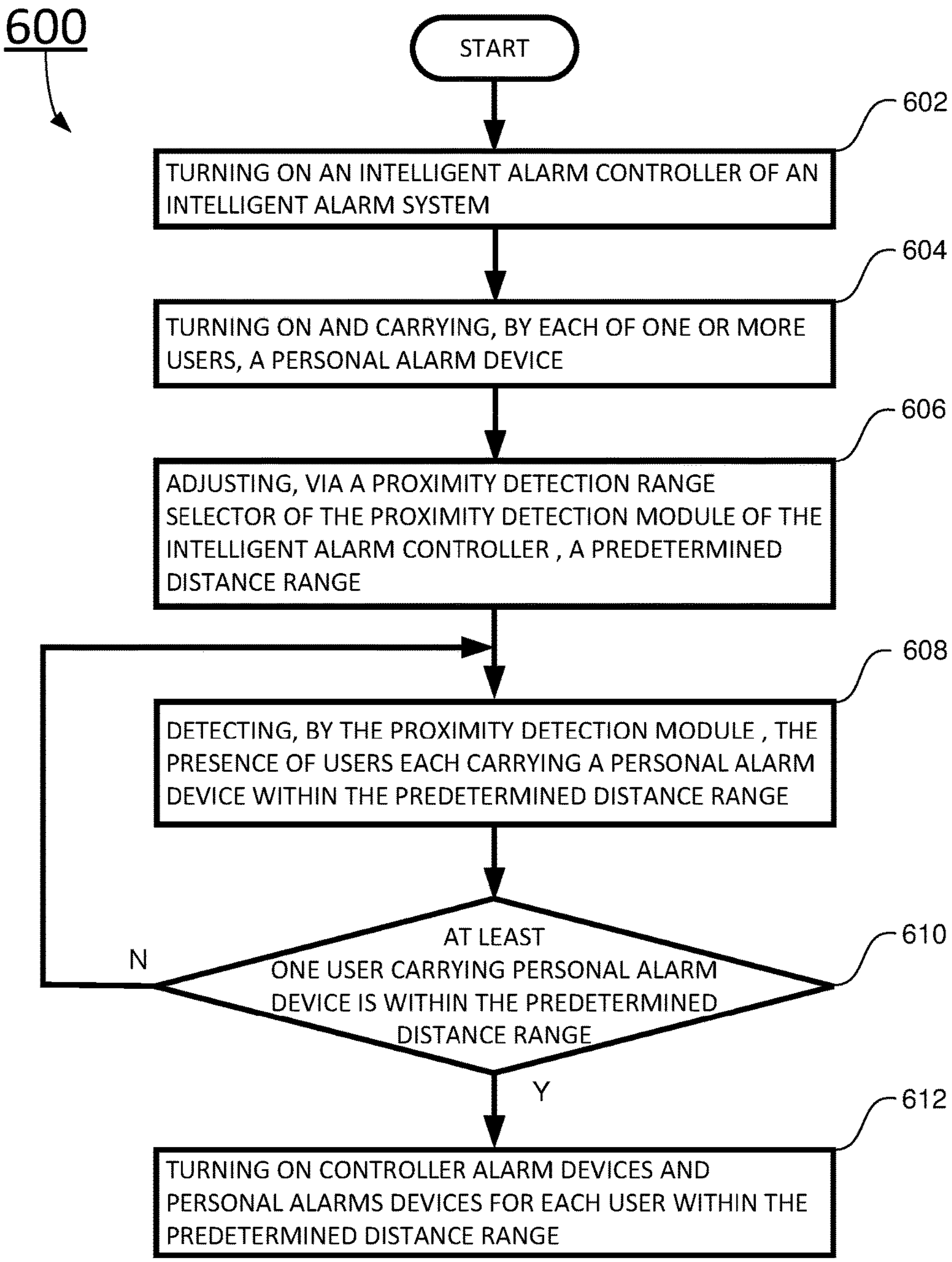

In yet another aspect, the present disclosure relates to a method 600 of using an intelligent alarm system 10. A flow chart of the method 600 is shown in FIG. 6 according to certain embodiments of the present disclosure.

At block 602, in one embodiment, an operator of the forklift, the crane or the heavy truck turns on the intelligent alarm controller 110 of the intelligent alarm system 10. In another embodiment, the caregiver or the teacher turns on the intelligent alarm controller 110 of the intelligent alarm system 10. The intelligent alarm controller 110 includes a proximity detection module 1103, a transceiver module 1106, and an alarm control module 1105. The alarm control module 1105 is connected to a controller alarm device 112. The controller alarm device 112 is used to generate various audible or visual alarms.

At block 604, in one embodiment, each user turns on the personal alarm device 120 and carries the personal alarm device 120. In another embodiment, the caregiver or the teacher turns on the personal alarm device 120 and let each child carry the personal alarm device 120. The personal alarm device 120 may be clipped on a bracket on the user's hardhat or the user's uniform or cloth, or child's cloth. Each personal alarm device 120 includes a transceiver module 12002, and a personal alarm module 12004.

At block 606, the operator such as the operator of the forklift, the crane, or the heavy truck, or the caregiver of the teacher adjust a predetermined distance range using a dial of a proximity detection range selector 11034 of a proximity detection module 1103 of the intelligent alarm controller 110. The predetermined distance range defines the restricted area where the children are studying or playing.

At block 608, the intelligent alarm controller 110 constantly monitors the distance between each of the personal alarm devices 120 and the intelligent alarm controller 110, using the proximity detection module 1103 through a transceiver module 1106 of the intelligent alarm controller 110. The proximity determination module 11032 transmits ultra-wide band (UWB) radio frequency signals in its surrounding area through the transceiver module 1106. Each of the personal alarm devices 120 receives the UWB radio frequency signals and transmits a response signal back to the intelligent alarm controller 110 such that the proximity determination module 11032 can determine the distance between the personal alarm device and the intelligent alarm controller 110.

At query block 610, in one embodiment, the intelligent alarm controller 110 determines whether at least one of the users carrying the personal alarm device 120 enters the area defined by the predetermined distance range. In another embodiment, the intelligent alarm controller 110 determines whether at least one of the child carrying the personal alarm device 120 departs from the restricted area defined by the predetermined distance range. When the answer to question above is true, then the method proceeds to block 612 to trigger alarms. Otherwise, the method proceeds to block 608 continuing the monitoring process.

At block 612, the alarm control module 1105 of the intelligent alarm controller 110 turns on the alarm control module 1105 to generate audible and visible alarms of the intelligent alarm controller 110 through the controller alarm device 112.

In certain embodiments, the controller alarm device 112 may include an audible alarm module 1122, and a visual alarm module 1124. The audible alarm module 1122 may include a siren device 11222 for providing a series of audible sound alarms, and a speaker device 11224 for providing voice alarms in one or more spoken languages. The visual alarm module 1124 may include a strobe light device 11242 and a flash light device 11244. The strobe light device 11242 may provide visible strobe light alarms. The flash light device 11244 may provide visible flash light alarms.

In the embodiment for the workplace safety, the alarms generated by the controller alarm device 112 will remain on as long as there is at least one user carrying the personal alarm device 120 is within the predetermined distance range, and will go off when the last user carrying the personal alarm device 120 departs the area defined by the predetermined distance area. In the embodiment for the childcare safety, the alarms generated by the controller alarm device 112 will remain off as long as all children carrying the personal alarm devices 120 are within the restricted area defined by the predetermined distance range, and the controller alarm device 112 will generate audible and visual alarms when at least one child carrying the personal alarm device 120 departs from the restricted area.

Additionally, the transceiver module 1106 of the intelligent alarm controller 110 sends alarm signals to each of the personal alarm devices 120 within the predetermined distance range to turn on the personal alarm module 12004 to generate audible and visible alarms of the personal alarm device 120.

In certain embodiments, the personal alarm module 12004 may include a vibration alarm device 120042 for providing vibration alarm to the child, an audible alarm device 120044 for providing audible alarms to the child, and a visual alarm device 120046 for providing visual alarms to the child. When at least one of the children is determined by the intelligent alarm controller 110 to be outside of the restricted area, one or more alarms on the personal alarm devices 120 will be turned on by the personal alarm module 12004. The audible alarm device 120044 may include a siren device for providing audible sound alarms, and a speaker device for providing voice alarms in one or more spoken languages. The visual alarm module 12046 may include a strobe light device for providing visible strobe light alarms, and a flash light device for providing visible flash light alarms.

In the embodiment for the workplace safety, the alarms generated by the personal alarm device 120 will remain on as long as the user carrying the personal alarm device 120 remains in the area defined by the predetermined distance range, and will be turned off when the user departs the area. In the embodiment for the childcare safety, the alarms generated by the personal alarm device 120 will remain off as long as all children carrying the personal alarm devices 120 are within the restricted area defined by the predetermined distance range, and the personal alarm device 120 will generate audible and visual alarms when the child carrying the personal alarm device 120 departs from the restricted area.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An intelligent alarm system for moving vehicles, comprising:

a plurality of personal alarm devices, one for each of a plurality of users, wherein each of the plurality of personal alarm devices comprises a transceiver module and a personal alarm module for generating alarm when at least one of the plurality of users is positioned within a predetermined distance range from the moving vehicles; and an intelligent alarm controller installed on a moving vehicle, wherein the intelligent alarm controller comprises a proximity detection module for determining the distance between the intelligent alarm controller and each of the plurality of personal alarm devices located within the predetermined distance range, a transceiver module in communication with each of the transceiver module of the plurality of personal alarm devices within the predetermined distance range using ultra-wide band (UWB) radio frequency signals;

an alarm control module for generating alarms on the intelligent alarm controller and on each of the plurality of personal alarm devices located within the predetermined distance range, an in-range counter for counting the number of users within the predetermined distance range, and an in-range display for displaying the number of users within the predetermined distance range, wherein when at least one user carrying a personal alarm device approaches the intelligent alarm controller within the predetermined distance range, the intelligent alarm controller detects the presence of the user using the proximity detection module, turns on a controller alarm device using the alarm control module, and instructs all personal alarm devices within the predetermined distance range via each corresponding transceiver module of these personal alarm devices to turn on one or more alarms on each corresponding personal alarm device using the personal alarm module.

2. The intelligent alarm system according to claim 1, wherein the proximity detection module of the intelligent alarm controller comprises a proximity detection range selector for selecting the predetermined distance range, and a proximity determination module for determining the distance between the intelligent alarm controller and the personal alarm device, and determining whether the personal alarm device is within the predetermined distance range.

3. The intelligent alarm system according to claim 1, wherein the intelligent alarm controller comprises an in-range counter for counting the number of users within the predetermined distance range, and an in-range display for displaying the number of users within the predetermined distance range, wherein when a user carrying the personal alarm device enters the predetermined distance range, the in-range counter increases by one, and when a user carrying the personal alarm device exits the predetermined distance range, the in-range counter decreases by one, and the in-range display displays the number of users within the predetermined distance range to an operator of the moving vehicle.

4. The intelligent alarm system according to claim 1, wherein the alarm control module of the intelligent alarm controller turns on the controller alarm device when at least one user enters the predetermined distance range.

5. The intelligent alarm system according to claim 1, wherein the controller alarm device comprises an audible alarm module, and a visual alarm module.

6. The intelligent alarm system according to claim 5, wherein the audible alarm module of the controller alarm device comprises a siren device for providing a plurality of sound alarms, and a speaker device for providing voice alarms in a plurality of spoken languages, and the visual alarm module of the controller alarm device comprises a strobe light device for providing a plurality of strobe light alarms, and a flash light device for providing a plurality of flash light alarms.

7. The intelligent alarm system according to claim 1, wherein each of the plurality of personal alarm devices comprises the transceiver module for receiving the UWB radio frequency signals from the intelligent alarm controller, transmitting a response to the intelligent alarm controller when the intelligent alarm controller determines the distance between the intelligent alarm controller and the personal alarm devices, and receiving alarm signals from the intelligent alarm controller to turn on the personal alarm module.

8. The intelligent alarm system according to claim 7, wherein the personal alarm module comprises a vibration alarm device for providing vibration alarm to the user, an audible alarm device for providing audible alarms to the user, and a visual alarm device for providing visual alarms to the user, when the personal alarm module is turned on and when at least one user is determined to be in the predetermined distance range, wherein the audible alarm device comprises a siren device for providing a plurality of sound alarms, and a speaker device for providing voice alarms in a plurality of spoken languages, and the visual alarm module comprises a strobe light device for providing a plurality of strobe light alarms, and a flash light device for providing a plurality of flash light alarms.

9. The intelligent alarm system according to claim 1, wherein each of the plurality of personal alarm devices comprises a power module having a power switch for turning on and off the personal alarm device, and a power source for providing electrical power to the personal alarm devices, wherein the power source comprises a battery and a rechargeable battery.

10. An intelligent alarm system for monitoring user in a restricted area comprising:

a plurality of personal alarm devices, one for each of a plurality of users, wherein each of the plurality of personal alarm devices comprises a transceiver module and a personal alarm module for generating alarm when at least one of the plurality of users departs the restricted area and the distance between the personal alarm device and an intelligent alarm controller exceeds a predetermined distance range; and the intelligent alarm controller installed in the restricted area, wherein the intelligent alarm controller comprises:

a proximity detection module for determining the distance between the intelligent alarm controller and each of the plurality of personal alarm devices located within the predetermined distance range and within the restricted area, a transceiver module in communication with each of the transceiver module of the plurality of personal alarm devices within the predetermined distance range and within the restricted area using ultra-wide band (UWB) radio frequency signals;

an alarm control module for generating alarms on the intelligent alarm controller and on each of the plurality of personal alarm devices located within the predetermined distance range and within the restricted area, an in-range counter for counting the number of users within the predetermined distance range and within the restricted area, and an in-range display for displaying the number of users within the predetermined distance range and within the restricted area, wherein when at least one user carrying a personal alarm device departs the restricted area and the distance between the personal alarm device and the intelligent alarm controller exceeds the predetermined distance range, the intelligent alarm controller detects the absence of the user using the proximity detection module, turns on a controller alarm device in the restricted area using the alarm control module of the intelligent alarm controller, and the personal alarm device of the user turns on one or more alarms on the personal alarm device due to the absence of the UWB communication to the intelligent alarm controller.

11. The intelligent alarm system according to claim 10, wherein the proximity detection module of the intelligent alarm controller comprises a proximity detection range selector for selecting the predetermined distance range, and a proximity determination module for determining the distance between the intelligent alarm controller and the personal alarm device, and determining whether the personal alarm device is within the predetermined distance range and within the restricted area.

12. The intelligent alarm system according to claim 10, wherein when a user carrying the personal alarm device enters the predetermined distance range and the restricted area, the in-range counter increases by one, and when a user carrying the personal alarm device exits the restricted area and outside of the predetermined distance range, the in-range counter decreases by one, and the in-range display displays the number of users within the predetermined distance range and within the restricted area to an operator of the restricted area.

13. The intelligent alarm system according to claim 10, wherein the alarm control module of the intelligent alarm controller turns on the controller alarm device when at least one user exits the within the predetermined distance range and within the restricted area.

14. The intelligent alarm system according to claim 10, wherein the controller alarm device comprises an audible alarm module, and a visual alarm module.

15. The intelligent alarm system according to claim 14, wherein the audible alarm module of the controller alarm device comprises a siren device for providing a plurality of sound alarms, and a speaker device for providing voice alarms in a plurality of spoken languages, and the visual alarm module of the controller alarm device comprises a strobe light device for providing a plurality of strobe light alarms, and a flash light device for providing a plurality of flash light alarms.

16. The intelligent alarm system according to claim 10, wherein each of the plurality of personal alarm devices comprises the transceiver module for receiving the UWB radio frequency signals from the intelligent alarm controller, transmitting a response to the intelligent alarm controller when the intelligent alarm controller determines the distance between the intelligent alarm controller and the personal alarm devices, and receiving alarm signals from the intelligent alarm controller to turn on the personal alarm module.

17. The intelligent alarm system according to claim 16, wherein the personal alarm module comprises a vibration alarm device for providing vibration alarm to the user, an audible alarm device for providing audible alarms to the user, and a visual alarm device for providing visual alarms to the user, wherein when at least one of the users within the predetermined distance range and within the restricted area is determined by the intelligent alarm controller to be outside of the predetermined distance range and outside of the restricted area, one or more alarms on the personal alarm device will be turned on by the personal alarm module, wherein the audible alarm device comprises a siren device for providing a plurality of sound alarms, and a speaker device for providing voice alarms in a plurality of spoken languages, and the visual alarm module comprises a strobe light device for providing a plurality of strobe light alarms, and a flash light device for providing a plurality of flash light alarms.

18. The intelligent alarm system according to claim 10, wherein each of the plurality of personal alarm devices comprises a power module having a power switch for turning on and off the personal alarm device, and a power source for providing electrical power to the personal alarm devices, wherein the power source comprises a battery, and a rechargeable battery.

19. A method of using an intelligent alarm system for a moving vehicle, comprising:

turning on, by an operator of the moving vehicle, an intelligent alarm controller of the intelligent alarm system, wherein the intelligent alarm controller comprises a proximity detection module, a transceiver module in communication with each of the transceiver module of the plurality of personal alarm devices within the predetermined distance range using ultra-wide band (UWB) radio frequency signals, an alarm control module for generating alarms on the intelligent alarm controller and on each of the plurality of personal alarm devices located within the predetermined distance range, an in-range counter for counting the number of users within the predetermined distance range and within the restricted area, and an in-range display for displaying the number of users within the predetermined distance range and within the restricted area;

turning on and carrying, by each of a plurality of users, a personal alarm device, wherein the personal alarm device comprises a transceiver module, and a personal alarm module;

establishing ultra-wide band (UWB) radio frequency communication between the intelligent alarm controller and the plurality of personal alarm devices;

adjusting, by the operator of the moving vehicle, using a proximity detection range selector of the proximity detection module, a predetermined distance range;

monitoring, by an operator of the moving vehicle, the number of users within the predetermined distance range through the in-range display;

detecting, by the proximity detection module, presence of the plurality of users carrying the personal alarm device within the predetermined distance range using UWB radio frequency signals; and turning on, by the intelligent alarm controller, a controller alarm device to generate audible and visible alarms of the intelligent alarm system; and sending, by the transceiver module of the intelligent alarm controller, alarm signals to each of the personal alarm devices within the predetermined distance range to turn on the personal alarm module to generate audible and visible alarms of the personal alarm device, when at least one user carrying the personal alarm device is within the predetermined distance ranger.

20. The method according to claim 19, further comprising:

turning on, by the intelligent alarm controller, the controller alarm device to generate audible and visible alarms of the intelligent alarm system; and sending alarm signals to each of the personal alarm devices within the predetermined distance range to turn on the personal alarm module to generate audible and visible alarms of the personal alarm device, when at least one user carrying the personal alarm device moves outside of the predetermined distance ranger.

* * * * *